Jan. 31, 1933.                R. T. KINTZING                1,895,931
SYNCHRONOUS MOTOR CONTROL SYSTEM
Filed Jan. 20, 1930
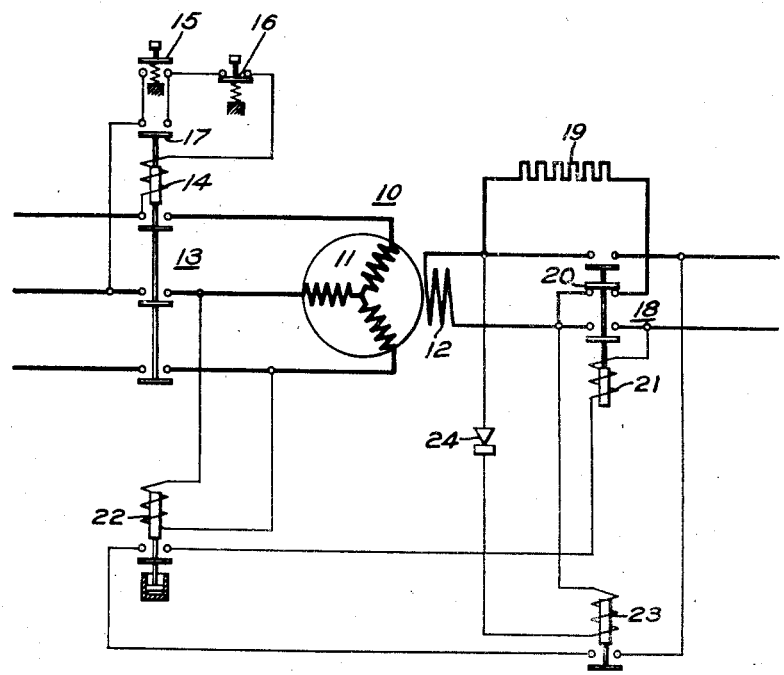
INVENTOR
Reese T. Kintzing.
BY
ATTORNEY Patented Jan. 31, 1933

1,895,931

UNITED STATES PATENT OFFICE

REESE T. KINTZING, OF WILKINSBURG, PENNSYLVANIA, ASSIGNOR TO WESTINGHOUSE ELECTRIC & MANUFACTURING COMPANY, A CORPORATION OF PENNSYLVANIA

SYNCHRONOUS MOTOR CONTROL SYSTEM

Application filed January 20, 1930. Serial No. 421,951.

My invention relates to motor-control systems and particularly to systems for starting synchronous motors.

The object of my invention, generally stated, is to improve the starting characteristics of synchronous motors.

A more specific object of my invention is to increase the pull-in or synchronizing torque of synchronous motors by so controlling the application of voltage to the field winding that the torque resulting from such application and the torque resulting from application of voltage to the armature winding are in cumulative relation.

Another object of my invention is to automatically apply direct-current voltage to the field winding of a synchronous motor when the motor has accelerated to approximately synchronous speed.

When synchronous motors are started by impressing an alternating-current voltage upon the armature winding, it is customary to short circuit the field winding through a resistor, in order to reduce the voltage which is induced in the field winding during starting. After the motor has been brought up to speed, the field winding is excited from a direct-current source, and the current in the field is adjusted according to the load on the motor.

The frequency of the alternating-current voltage induced in the field winding during starting gradually decreases as the motor approaches synchronous speed. The use of this induced-field frequency for determining the proper time to apply voltage to the field winding has been practiced but it has recently been found that improved starting conditions will result if the direct-current voltage is applied to the field winding when the induced current is in the proper direction. Higher pull-in or synchronizing torque can be secured, if voltage is applied to the field winding during the right part of the induced-frequency cycle.

According to my invention, I provide a control system which will apply the direct-current voltage to the field winding of a synchronous motor when the correct speed has been attained and when the induced current in the field winding is in the direction which will give the most effective synchronizing torque.

For a fuller understanding of the nature and objects of the invention, reference should be had to the following detailed description, taken in conjunction with the accompanying drawing, in which the single figure is a diagrammatic view of a control system organized in accordance with my invention.

Referring to the drawing, the system shown comprises a synchronous motor 10 having an armature winding 11 and a field winding 12. The armature winding 11 may be connected to a three-phase alternating-current source of power (not shown) by an electrically operated line switch 13. The energization of the actuating coil 14 of the switch 13 may be controlled by actuation of the push-button switches 15 and 16.

In order to actuate the switch 13, the push-button switch 15 is closed to establsh a circuit which extends from one terminal of the power source, through switches 15 and 16 and the actuating coil of the switch 13, back to another terminal. A holding circuit for the switch 13 is established by an inter-lock 17 which is closed when the main contact members of the switch 13 are closed.

If it is desired to stop the motor, the coil 14 may be deenergized and the switch 13 be permitted to open by opening the push-button switch 16.

The field winding 12 of the motor 10 may be connected to a direct-current source (not shown) by an electrically operated switch 18. In order to reduce the voltage induced in the field winding 12 while the synchronous motor 10 is being started, the field winding is disposed to be shunted by a resistor 19 during the starting period.

As is the usual practice in synchronous-motor-starting systems, an interlock 20 is provided on the field switch 18 for connecting the resistor 19 in series-circuit relation to the field winding 12. As shown, the interlock 20 is closed when the main contact members of the field switch 18 are open.

As will be observed, the energization of the actuating coil 21 of the field switch 18 may be controlled by the operation of relays 22 and 23. The relay 22 is a definite time-delay relay. As shown, the actuating coil of this relay is energized when the armature winding of the motor 10 is energized. The timing mechanism of the relay may be designed to retard the movement of the bridging member to prevent the establishment of an actuating circuit for the switch 18 for a predetermined time, which time period corresponds to the time required for the motor 10 to accelerate to approximately synchronous speed.

It will be observed that the actuating coil of the relay 23 is connected across the field winding 12 through a rectifier 24. As previously explained, an alternating current is induced in the field winding 12 when the motor 10 is being accelerated. The rectifier 24 permits only one half of the induced-current wave to flow through the coil of the relay 23. When the polarity of the induced current is in the proper direction to flow through the rectifier, the actuating coil of the relay 23 is energized. The rectifier 24 is so connected that the relay 23 is energized when the polarity of the induced current in the field winding 12 is such that the starting torque is in the same direction as the torque resulting from the application of voltage to the field winding.

The motor 10 may be started by closing the push-button switch 15 to energize the actuating coil of the line switch 13. The coil of the relay 22 is energized when the switch 13 is closed, and the contact members of the relay 22 are closed after sufficient time has elapsed to permit the acceleration of the motor 10 to approximately synchronous speed.

As the motor approaches synchronous speed, the frequency of the voltage induced in the field winding 12 gradually decreases. The impulses of current which flow through the rectifier 24 actuate the relay 23, and its contact members are alternately closed and opened. It will be seen that the actuating coil 21 of the field switch 18 will be energized the first time that the contact members of relay 23 are closed after the contact members of relay 22 have been closed, and voltage will be applied to the field winding 12 when the polarity of the voltage induced in the field winding is in the proper direction to permit the torque resulting from the action of the starting winding to be in cumulative relation to the torque resulting from the application of voltage to the field.

As previously explained, it has been proved by experiment that the synchronizing torque of synchronous motors can be increased by applying direct-current voltage to the field winding when the induced current in the field winding is in the proper direction to produce a cumulative torque action.

I do not desire to be restricted to the particular form of arrangement of parts herein shown and described since it is evident that they may be changed and modified without departing from the spirit and scope of my invention as defined in the appended claims.

I claim as my invention:

1. In a starting system for synchronous motors, in combination, a motor provided with field and armature windings, means for applying voltage to the armature winding, means for applying voltage to the field winding, and control means including current rectifying means responsive to the voltage induced in the field winding and disposed to govern the functioning of the means for applying voltage to the field winding to effect a cumulative relation between the torque resulting from the application of voltage to the armature winding and the torque resulting from the application of voltage to the field winding.

2. In a starting system for synchronous motors, in combination, a motor provided with field and armature windings, means for applying voltage to the armature winding, means for applying voltage to the field winding, means responsive to the voltage induced in the field winding and disposed to govern the functioning of the means for applying voltage to the field winding to effect a cumulative relation between the torque resulting from the application of voltage to the armature winding and the torque resulting from the application of voltage to the field winding, and a time-delay relay responsive to the voltage applied to the armature winding for preventing the application of voltage to the field winding for a predetermined time interval after the application of voltage to the armature winding.

3. In a starting system for synchronous motors, in combination, a motor provided with field and armature windings, means for controlling the energization of the armature winding, a switch for controlling the energization of the field winding, a relay disposed to be energized when a voltage is induced in the field winding for controlling the actuation of the field-winding switch, and a rectifier interposed between the field winding and the relay to prevent the operation of the relay except when the torque produced by the armature winding and the torque produced by the field are in cumulative relation.

4. In a starting system for synchronous motors, in combination, a motor provided with field and armature windings, means for controlling the energization of the armature winding, a switch for controlling the energization of the field winding, a relay disposed to be energized when a voltage is induced in the field winding for controlling the actuation of the field switch, a rectifier interposed between the field winding and the relay to prevent the operation of the relay except when the torque produced by the armature winding and the torque produced by the field are in cumulative relation, and a time-delay relay for controlling the functioning of the field switch.

5. In a motor-control system, in combination, a motor provided with field and armature windings, means for applying voltage to the armature winding, means for applying voltage to the field winding, and control means including current rectifying means responsive to the current induced in the field winding for controlling the functioning of the means for applying voltage to the field winding.

6. In a motor-control system, in combination, a motor provided with field and armature windings, means for applying voltage to the armature winding, means for applying voltage to the field winding, means responsive to the direction of the current induced in the field winding for controlling the functioning of the means for applying voltage to the field winding, and a timing device responsive to the voltage applied to the armature winding for governing the application of voltage to the field winding.

7. In a motor-control system, in combination, a synchronous motor, a source of alternating-current power for the motor, means for connecting the source of power to the motor-armature winding, means for short circuiting the field winding of the motor, a source of direct current for the field of the motor, means for removing the short circuit from the field winding, means for connecting the source of direct current to the field winding, and control means including current rectifying means responsive to the induced current in the field winding for controlling the said means for connecting the source of direct current to the field winding.

8. In a motor-control system, in combination, a synchronous motor, a source of alternating-current power for the motor, means for connecting the source of power to the motor-armature winding, means for short circuiting the field winding of the motor through a resistor, a source of direct current for the field of the motor, means for removing the short circuit from the field winding, means for connecting the source of direct current to the field winding, control means including current rectifying means responsive to the induced current in the field winding for controlling the said means for connecting the source of direct current to the field winding, and means for preventing the source of direct current from being connected to the field winding for a definite time after the source of power is connected to the armature winding.

In testimony whereof, I have hereunto subscribed my name this 9th day of January 1930.

REESE T. KINTZING.